US006264575B1

United States Patent
Lim et al.

(10) Patent No.: US 6,264,575 B1
(45) Date of Patent: Jul. 24, 2001

(54) FREEWHEEL FOR A BICYCLE

(75) Inventors: Puat Thiam Lim, Singapore (SG); Takeshi Oi, Osaka (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/288,165

(22) Filed: Apr. 8, 1999

(51) Int. Cl.[7] .............................. F16H 9/00; F16D 23/00
(52) U.S. Cl. ........................ 474/77; 474/78; 474/160; 192/64
(58) Field of Search ................................. 474/160, 158, 474/77, 78, 164, 165, 903; 280/238, 160.1; 192/64, 45; 301/105–112

(56) References Cited

U.S. PATENT DOCUMENTS

| 3,661,021 | * | 5/1972 | Ohshita | 474/160 X |
|---|---|---|---|---|
| 3,900,088 | | 8/1975 | Ozaki | 192/64 |
| 3,972,245 | * | 8/1976 | Allen | 474/160 |
| 4,121,474 | * | 10/1978 | Arregui Suinaga | 474/160 |
| 4,732,051 | * | 3/1988 | Ozaki et al. | 474/160 X |
| 5,194,051 | | 3/1993 | Nagano | 474/160 |
| 5,324,100 | * | 6/1994 | James | 474/160 X |
| 5,704,859 | | 1/1998 | Feng et al. | 474/78 |
| 5,788,593 | * | 8/1998 | Tiong | 474/160 |
| 5,816,377 | | 10/1998 | Nakamura | 192/64 |

* cited by examiner

Primary Examiner—David A. Bucci
Assistant Examiner—Marcus Charles
(74) Attorney, Agent, or Firm—Shinjyu Global IP Counselors, LLP (57) ABSTRACT

A freewheel is provided for mounting a plurality of sprockets on an axle of a bicycle. The freewheel basically includes an inner tubular body, an outer tubular body coaxially mounted on the inner tubular body with a bearing assembly rotatably coupling the inner tubular body to the outer tubular body. A one-way clutch is coupled between the inner tubular body and the outer tubular body to allow one-way rotation between the inner and outer tubular bodies. In the preferred embodiment, seven sprockets are mounted on the exterior of the outer tubular body. The bearing assembly has a pair of ball bearing races of the same diameter located at one end. An outer ball race or housing and a side plate are utilized in conjunction with the inner tubular body to fixedly secure the first and second ball bearings on the exterior surface of the inner tubular body. The inner tubular body with the bearings is then fixedly coupled to the outer tubular body so that the outer tubular body can rotate relative to the inner tubular body. The one-way clutch includes a pair of pawls attached to the inner tubular body and a set of ratchet teeth formed on the inner tubular body. The ratchet teeth are rotated between splines that are formed on the exterior surface of the outer body so as to maximize strength and minimize material. The outer tubular body has a step-shaped configuration with a plurality of abutment stoppers formed on the splines of the largest section such that some of the sprockets are installed from one direction and the other sprockets are installed in a second direction.

8 Claims, 9 Drawing Sheets

FREEWHEEL FOR A BICYCLE

BACKGROUND OF THE INVENTION

1. Field of the Invention

This invention generally relates to a freewheel for a bicycle. More specifically, the present invention relates to a freewheel for a bicycle that is compact to receive a small gear, such as an eleven teeth gear, at one end.

2. Background Information

Bicycling is becoming an increasingly popular form of recreation as well as a means of transportation. Moreover, bicycling has a become a very popular competitive sport. Whether the bicycle is used for recreation, transportation or competition, the bicycle industry is constantly improving their components. One particular component of the bicycle which has been extensively redesigned over the past years are the freewheel of the rear bicycle hub.

Specifically, most bicycles have several speeds. One popular form of drive train for a bicycle includes utilizing a plurality of sprockets that are mounted on the hub of the rear bicycle wheel. During pedaling, the bicycle chain engages one of the rear sprockets to rotate the rear wheel. When bicycle rider stops pedaling, the rear wheel should be able to continue to rotate while the sprockets remain stationary. Accordingly, the rear hub is provided with a freewheel that has a one-way clutch.

With an increased number of speeds provided by a derailleur of a bicycle today, a multi-step sprocket wheel unit for the rear wheel includes an increased number of sprockets which is now five to seven.

Freewheels used to transmit a driving force to the rear bicycle wheel in one rotation direction only are usually mounted on the rear hub of a bicycle. Freewheels are used so that the bicycle can advance freely without any rotation of the pedals. Freewheels include boss type freewheels which are mounted on the boss of the rear hub by being screwed onto the rear hub, and freehub type freewheels which are fastened to the rear hub as integral parts of the rear hub. Both types of freewheels are equipped with an outer tubular part, an inner tubular part which is installed radially inwardly of the outer tubular part so that the inner tubular part is free to rotate relative to the outer cylinder part, and a one-way clutch which is installed between the outer tubular part and inner tubular part for transmitting the driving force from the outer tubular part to the inner tubular part in one rotational direction only. The outer tubular part has a plurality of gears mounted thereon, while the inner tubular part is usually mounted on the rear hub of the bicycle.

Splines are formed between the sprocket wheels and boss to prohibit relative rotation therebetween positively. Since this unit is used for the rear wheel of a bicycle, drive must be transmitted between the rear wheel axle and boss through a one-way mechanism. For this purpose, the boss is formed as an outer race of a one-way clutch, and the one-way clutch and inner race are disposed on an inner periphery of the boss.

As the number of rear gears or sprockets have increased over the years, the freewheel has become larger and heavier. Moreover, with the increased number of gears or sprockets, a wider range of torque is being applied from the sprockets to the freewheel.

In view of the above, there exists a need for a freewheel for a bicycle which overcomes the above mentioned problems in the prior art. This invention addresses this need in the prior art as well as other needs, which will become apparent to those skilled in the art from this disclosure.

SUMMARY OF THE INVENTION

One object of the present invention is to provide a freewheel that can support several sprockets and is compact at one end to receive a small gear.

The foregoing objects can basically be attained by providing a freewheel for a bicycle, comprising an inner tubular body having a first section and a second section, the first section having a first inner bearing surface; an outer tubular body concentrically arranged about the inner tubular body for relative rotational movement therebetween, the outer tubular body having a first section with a predetermined diameter and a second section with a predetermined diameter that is smaller than the predetermined diameter of the first section of the outer tubular body; an outer ball housing removably secured to the first section of the outer tubular body, the outer ball housing having an outer bearing surface; and a set of first bearings located between the first bearing surface and the inner tubular body in a first circular pattern; and a set of second ball bearings located between second inner and outer bearing surfaces in a second circular pattern, the first and second circular patterns being substantially identical in diameters.

The foregoing objects can also be attained by providing a freewheel for a bicycle, comprising an inner tubular body having a first section and a second section, the first section having a first inner bearing surface; an outer tubular body concentrically arranged about the inner tubular body for relative rotational movement therebetween, the outer tubular body having a first section with a diameter and a second section with a diameter that is smaller than the predetermined diameter of the third section, the outer tubular body has an external surface with splines thereon and an internal surface with ratchet teeth thereon, the splines being located between and overlapping adjacent of the ratchet teeth; and a first set of bearings located between the inner and outer tubular bodies in a first circular pattern.

In accordance with another aspect of the present invention, a freewheel is provided that includes a freewheel for a bicycle, comprising an inner tubular body having a first inner section with a first diameter and a second inner section with a second diameter that is smaller than the first diameter, the first section having a first inner bearing surface; an outer tubular body concentrically arranged about the inner tubular body for relative rotational movement therebetween, the outer tubular body having a first outer section with a third diameter and a second outer section with a fourth diameter that is smaller than the third diameter, the first outer section having an abutment stopper extending outwardly therefrom in a radial direction; a first set of bearings located between first inner and outer tubular body surfaces in a first circular pattern.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
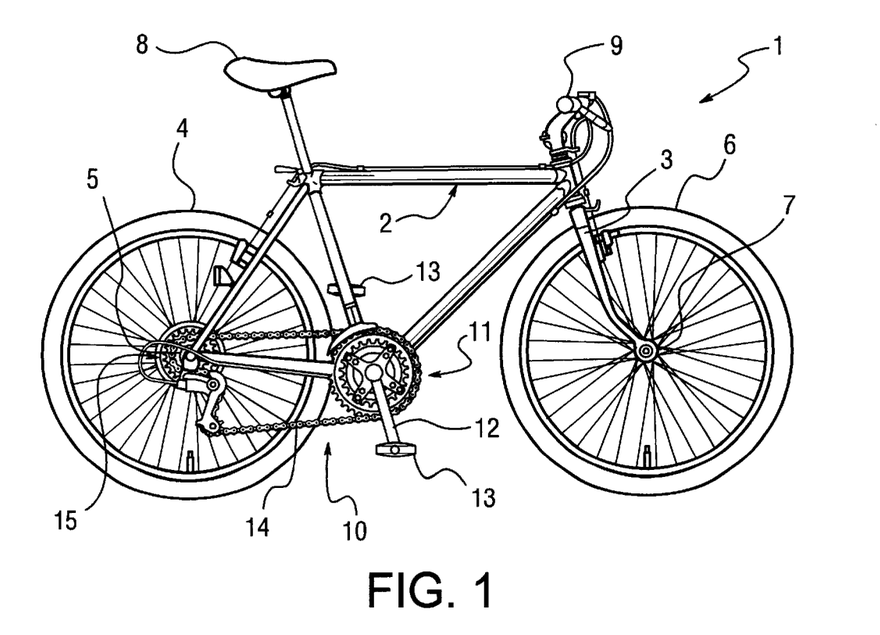
FIG. 1 is a side elevational view of a conventional bicycle with a freewheel in accordance with a first embodiment of the present invention.
Figure 2:
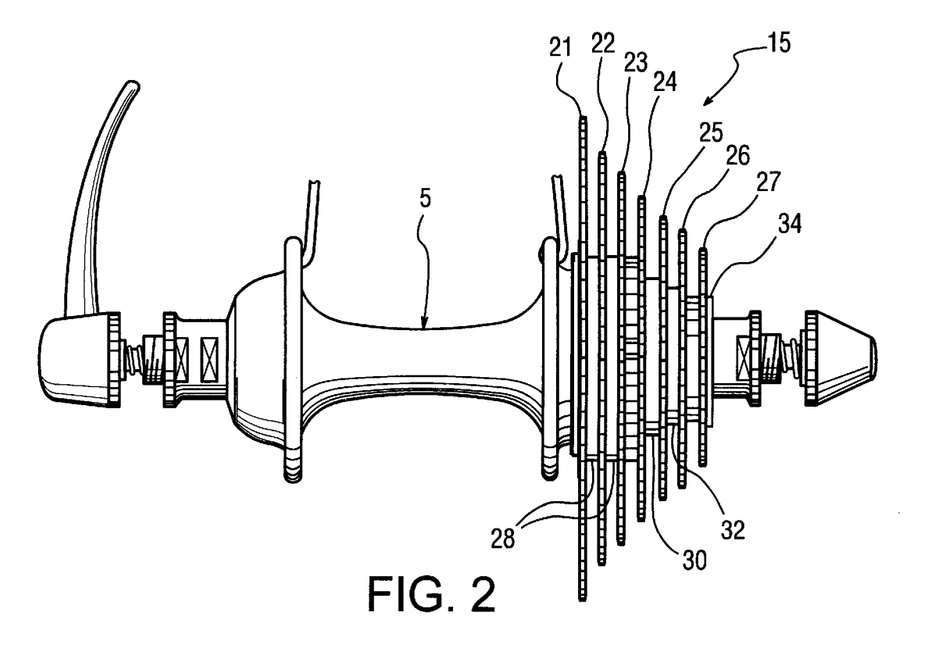
FIG. 2 is a side elevational view of the freewheel mounted on a rear axle and a plurality of sprockets coupled thereto.
Figure 3:
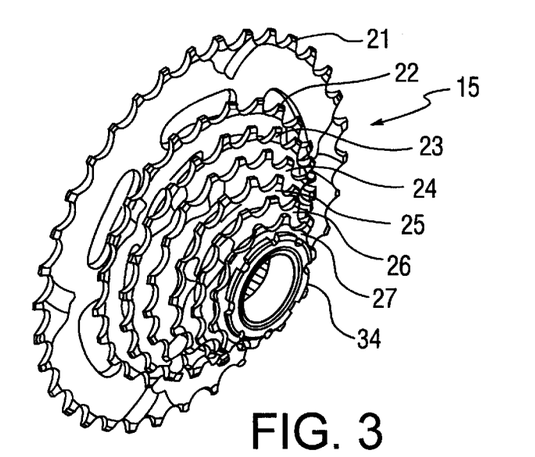
FIG. 3 is a perspective view of a freewheel in accordance with the present invention, with seven sprockets coupled thereto.

Referring initially to FIGS. 1–3, a bicycle 1 is illustrated with the present invention installed thereon as discussed below. Bicycle 1 has a frame 2 with a front fork 3 movably coupled thereto, a rear wheel 4 rotatably coupled to frame 2 via a rear hub 5, a front wheel 6 rotatably coupled to frame 2 via a front hub 7, a seat 8 adjustably coupled to frame 2, a handlebar 9 coupled to front fork 3 for turning front wheel 6 and a drive train 10 for propelling bicycle 1. Drive train 10 basically includes a front set of sprockets 11 rotatably to frame 2 via a bottom bracket (not shown), a pair of crank arms 12 with pedals 13, a drive chain 14 and a freewheel 15 coupled to rear hub 5 of rear wheel 4 in a conventional manner. Since these parts of bicycle 10 are well known in the art, these parts will not be discussed or illustrated in detail herein, except as they are modified in accordance with the present invention. Moreover, various conventional bicycle parts such as brakes, derailleurs, additional sprocket, etc., which are not illustrated and/or discussed herein, can be used in conjunction with the present invention.

Figure 4:
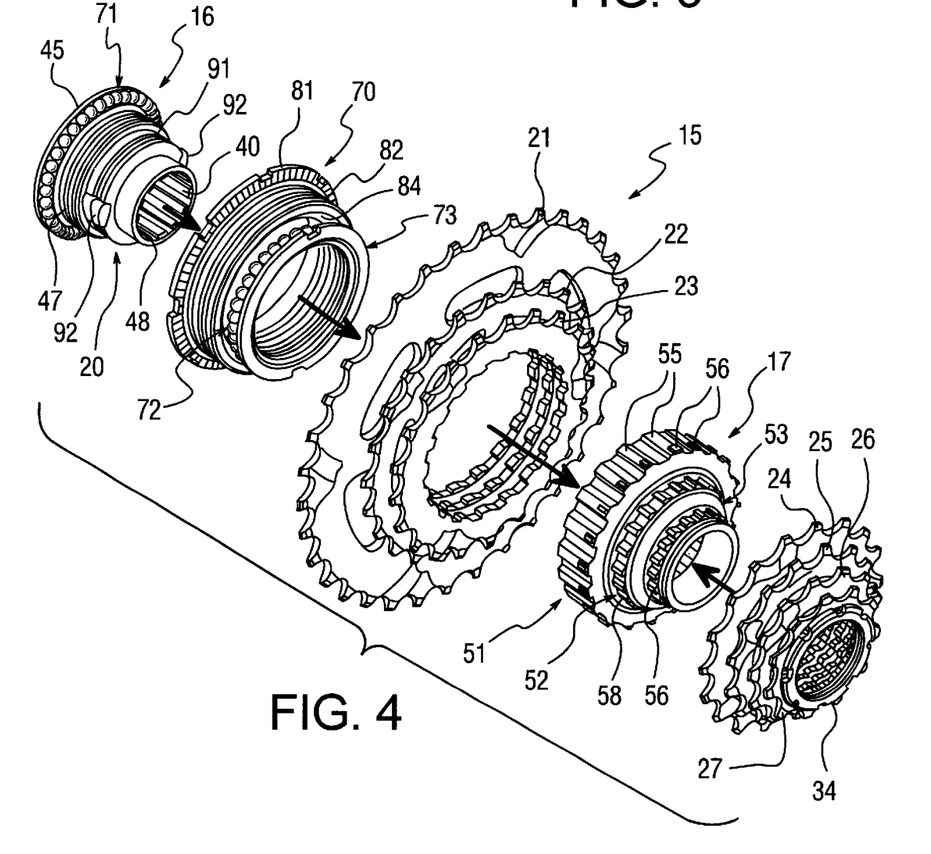
FIG. 4 is a partially exploded perspective view of the freewheel illustrated in FIGS. 1–3.
Figure 5:
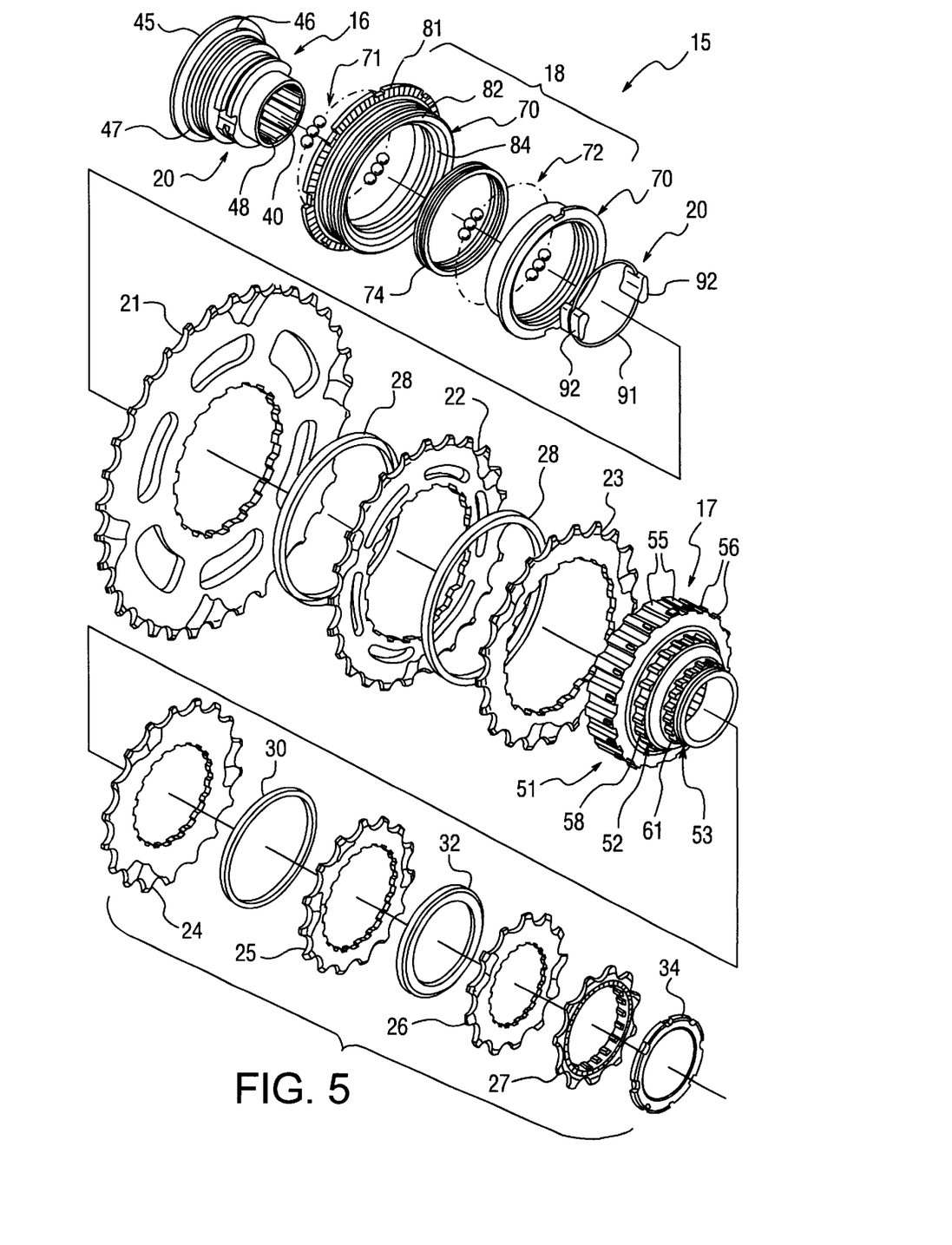
FIG. 5 is a further exploded perspective view of the freewheel illustrated in FIGS. 1–4.
Figure 6:
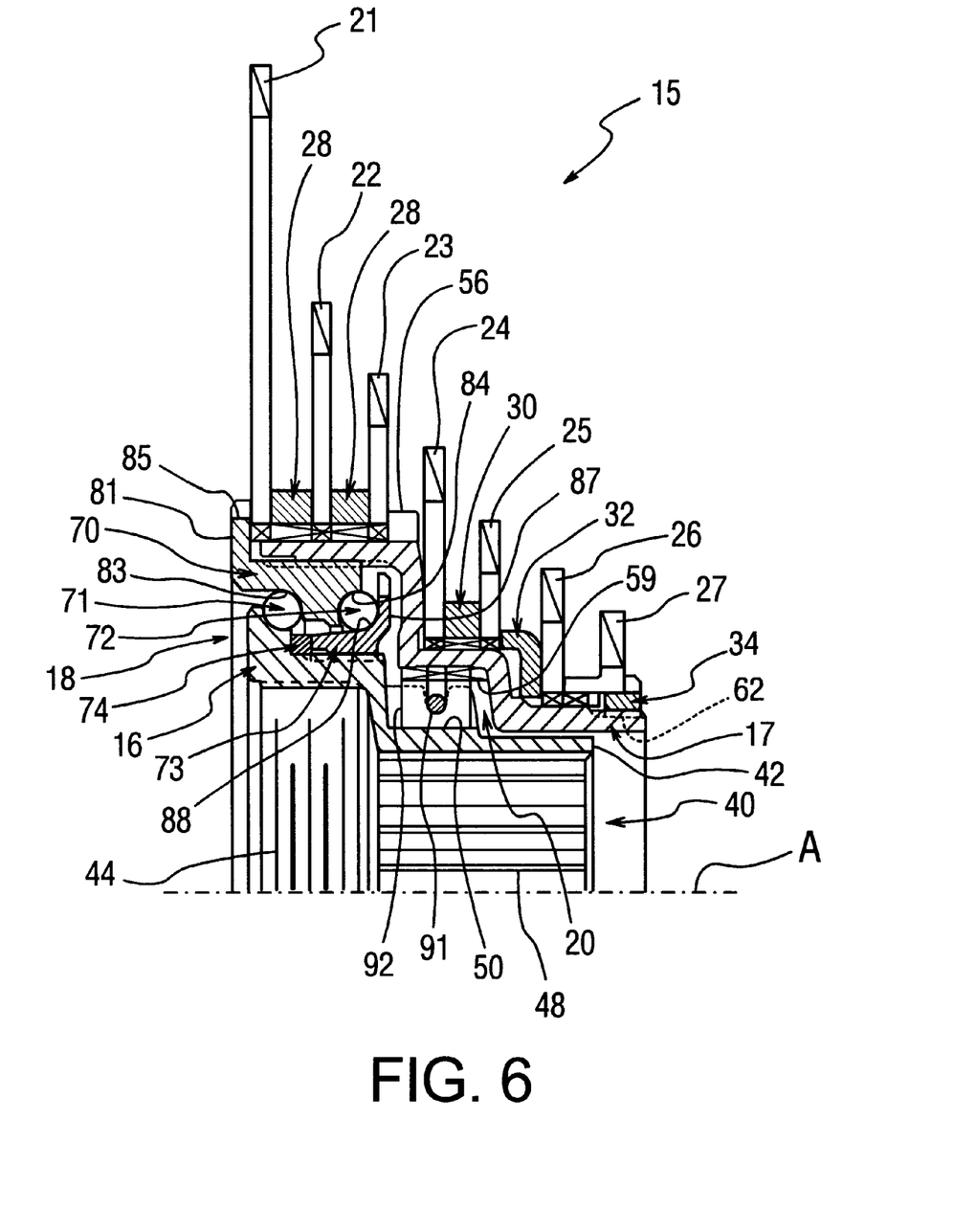
FIG. 6 is a partial longitudinal cross-sectional view of the freewheel illustrated in FIGS. 1–5.

Referring now to FIGS. 4–6, freewheel 15 basically includes an inner tubular body 16, an outer tubular body 17 coaxially mounted on inner tubular body 16, a bearing assembly 18 rotatably coupling inner tubular body 16 to outer tubular body 17 and a one-way clutch 20 coupled between inner tubular body 16 and outer tubular body 17 so as to allow one way rotation between inner and outer tubular bodies 16 and 17. As mentioned above, freewheel 15 is fixedly coupled to rear hub 5 as seen in FIG. 2.

In the preferred embodiment, outer tubular body 17 has seven sprockets 21–27 non-rotatably mounted to the external surface of outer tubular body 17. The spacing between sprockets 21–27 are maintained by two large spacers 28, one medium spacer 30 and one smaller L-shaped spacer 32. The bearing assembly 18 retains sprockets 21 22 and 23 on the outer tubular body 17 as discussed below, while sprockets 24–27 are retained on the outer surface of outer tubular body 17 via a locking ring 34.

Figure 7:
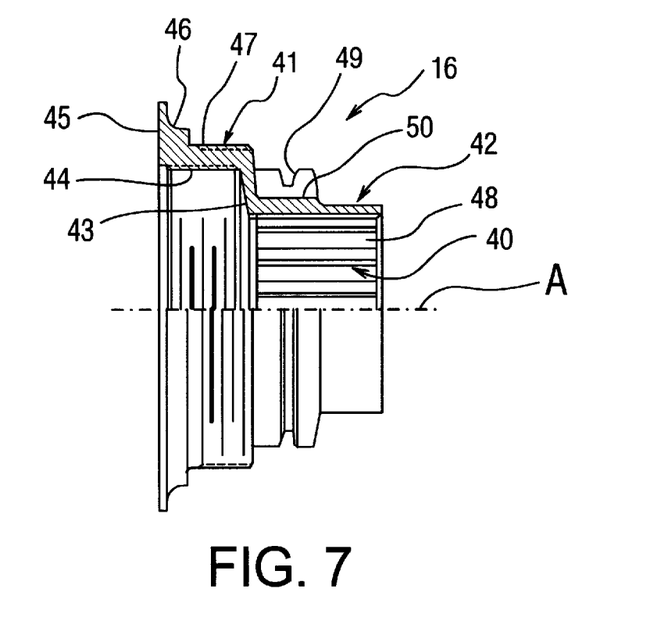
FIG. 7 is a side elevational view of the inner tubular body of the freewheel illustrated in FIGS. 1–6, with the upper portion shown in cross-section.
Figure 8:
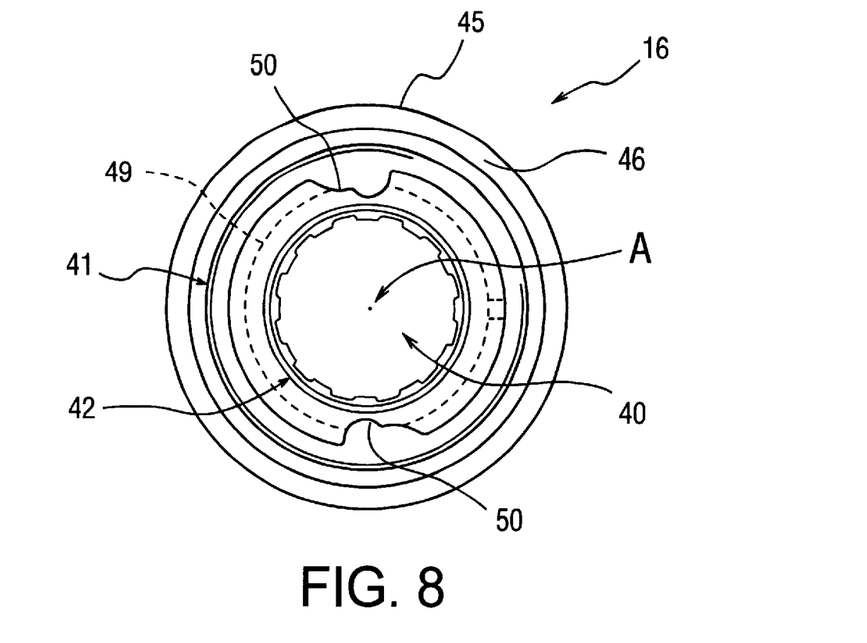
FIG. 8 is a right end elevational view of the inner tubular body illustrated in FIG. 7 for the freewheel illustrated in FIGS. 1–6.

As seen in FIGS. 6–8, inner tubular body 16 will now be discussed in more detail. Inner tubular body 16 has a step-shaped configuration with an axially extending bore 40 defining a step-shaped internal surface. Basically, inner tubular body 16 has a first inner section 41, a second inner section 42 and an annular wall 43 extending between first inner section 41 and second inner section 42. First inner section 41 has a first effective diameter, while second inner section 42 has a second effective diameter that is smaller than the first diameter of the first inner section 41. Preferably, inner tubular body 16 is constructed of a rigid lightweight material. For example, inner tubular body 16 can be a one-piece, unitary member constructed of aluminum, titanium, steel, etc.

First inner section 41 is a tubular section with an internal surface having a threads 44 formed thereon. Threads 44 are adapted to threadedly receive a portion of rear hub therein for fixedly securing the freewheel 15 to bicycle 1. The external surface of first inner section 41 has an annular flange 45 with a curved bearing surface 46 formed thereon, and a set of external threads 47 for securing a portion of bearing assembly 18 thereto. Bearing surface 46 is a continuous annular surface, which is part of the bearing assembly 18. The bearing surface 46 is curved and faces substantially at a 45° angle relative to the axis of rotation A. In other words, bearing surface 46 faces outwardly from the external surface of first inner section 41 as well as somewhat axially towards second inner section 42.

Second inner section 42 is a tubular section with a set of splines 48 formed about its internal surface. The external surface of second inner section 42 has a step-shaped configuration with the larger diameter portion having an annular groove 49 and a pair of pawl seats 50. Groove 49 and pawl seats 50 are designed to receive a portion of the one-way clutch 20 to control rotation movement between inner tubular body 16 and outer tubular body 17. Thus, outer tubular body 17 can freely rotate in one direction about longitudinal axis A of inner tubular body 16, but cannot rotate in the opposite direction relative about longitudinal axis A of inner tubular body 16.

Figure 9:
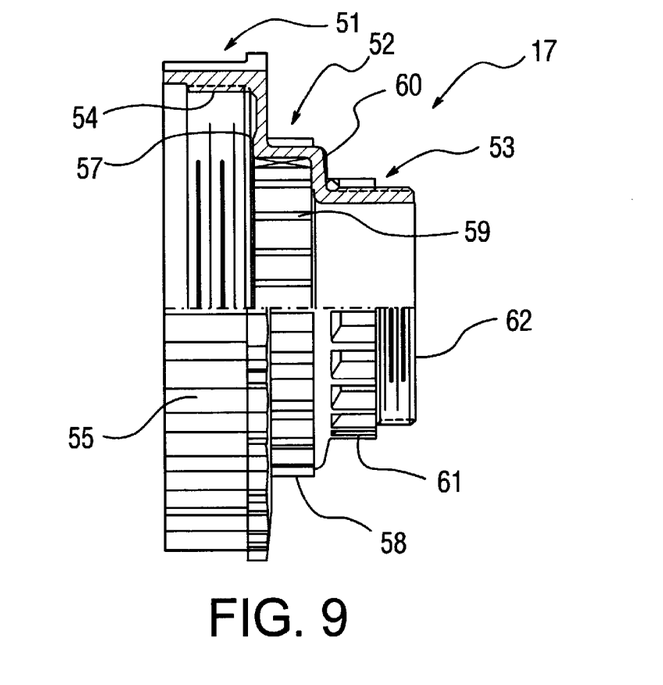
FIG. 9 is a side elevational view of the outer tubular body for the freewheel illustrated in FIGS. 1–6, with the upper portion illustrated in cross-section.
Figure 10:
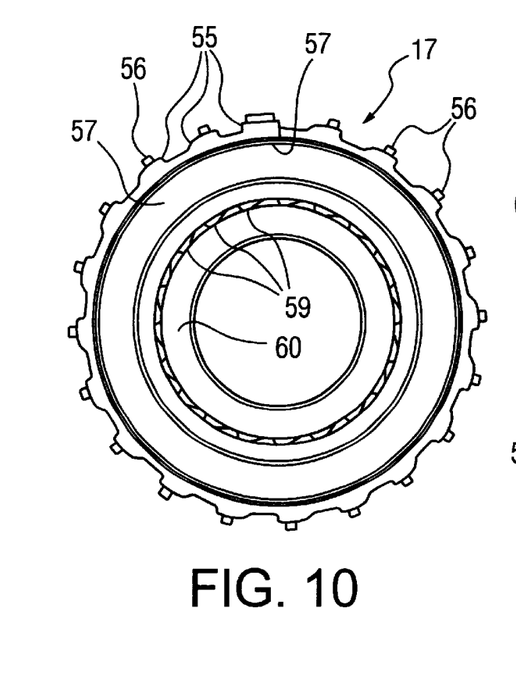
FIG. 10 is a left end elevational view of the outer tubular body illustrated in FIG. 9 for the freewheel illustrated in FIGS. 1–6.
Figure 11:
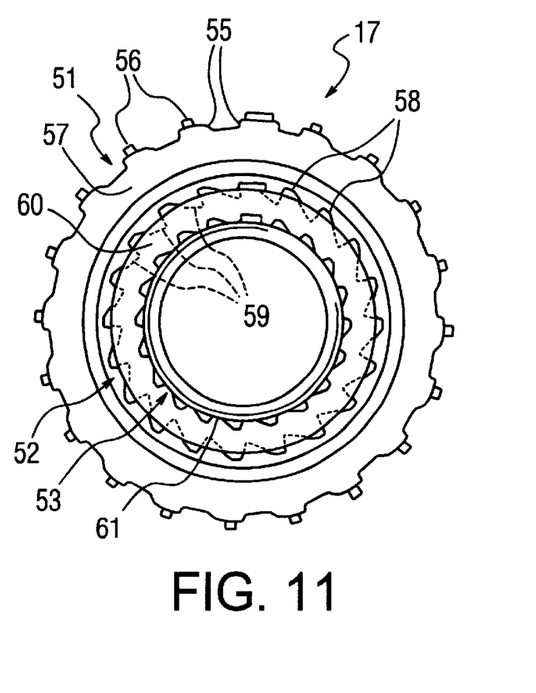
FIG. 11 is a right end elevational view of the outer tubular body illustrated in FIGS. 9 and 10 for the freewheel illustrated in FIGS. 1–6.

Referring now to FIGS. 9–11, outer tubular body 16 will now be discussed in more detail. Outer tubular body 17 is preferably formed as a one-piece, unitary member constructed of a substantially hard, rigid material. For example, outer tubular body 17 can be constructed of a lightweight metallic material such as aluminum or titanium or a slightly heavier material such as steel. Outer tubular body 17 has a step-shaped configuration with three steps of progressively decreasing diameters. More specifically, outer tubular body 17 has a first outer section 51 with a first pre-determined diameter, a second outer section 52 with a second predetermined diameter that is smaller than the first predetermined diameter of first outer section 51, and a third outer section 53 with a third pre-determined diameter that is smaller than the second predetermined diameter of the second outer section 52.

First outer section 51 has an internal surface with internal threads 54 for securing the portion of bearing assembly 18 thereto as discussed below. The external surface of first outer section 51 has a plurality of splines 55 extending around its periphery for non-rotatably securing sprockets 21–23 thereon. Each of the splines 55 has an abutment stopper 56 extending radially and outwardly therefrom. The abutment stoppers 56 limit axial movement of the sprockets 21–23 on the external surface of first outer section 51. In other words, the abutment stoppers 56 are located at the end of the external surface of first outer section 51 that is located closet to the second outer section 52.

Second outer section 52 is connected to first outer section 51 by a radially extending wall 57 forms an abutment for limiting axial movement of sprockets 24 and 25 on the external surface of second outer section 52. More specifically, second outer section 52 has a plurality of axially extending splines 58 formed about the periphery of second outer section 52. Splines 58 prevent relative rotational movement between sprockets 24 and 25 and outer tubular body 17. The internal surface of second outer section 52 is provided with ratchet teeth 59 extending about its inner periphery as seen in FIGS. 9–10.

Ratchet teeth 59 form a portion of the one-way clutch 20, which will be discussed below in more detail. Ratchet teeth 59 are positioned so that they are located between splines 58 so that the outer tubular body 17 can be made strong and compact enough to handle the force applied by small sprockets. Preferably, ratchet teeth 59 overlap a portion of adjacent splines 58 as best seen in FIG. 11. In any event, the majority of ratchet teeth 59 are located in the grooves between splines 58.

Third outer section 53 is coupled to the second outer section 52 via a radially extending wall 60. Wall 60 of outer tubular body 17 together with wall 43 of inner tubular body 16 form a space therebetween in which one-way clutch 20 is located. As seen in FIG. 6, walls 43 and 60 limit axial movement of one-way clutch 20 between inner and outer tubular bodies 16 and 17. Third outer section 53 has a splined portion with a plurality of axially extending splines 61 located about its outer periphery, and a threaded portion with a plurality of threads 62. Splines 61 are designed to non-rotatably secure sprockets 26 and 27 on a third outer section 53 of outer tubular body 17 so that sprockets 26 and 27 do not rotate relative to outer tubular body 17. Threads 62 of third outer section 53 are adapted to threadedly receive lock-ring 34 thereon for securing sprockets 26 and 27 on third outer section 53, as well as sprockets 24 and 25 on second outer section 52.

Referring again to FIGS. 4–6, bearing assembly 18 will now be discussed in more detail. Bearing assembly 18 preferably includes an outer ball race or housing 70, a first set of ball bearings 71, a second set of ball bearings 72, a side plate 73 and a shim or shims 74. Outer bearing surface 46 of inner tubular body 16 also forms part of bearing assembly 18. Since bearing assembly 18 is all located at one end of the freewheel 15, the other end can be constructed to accommodate a small gear such as an eleven teeth gear 27 as shown in FIG. 5.

Figure 12:
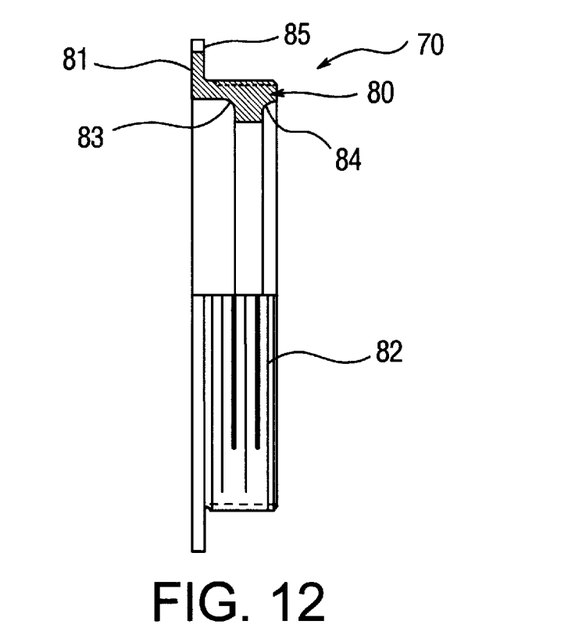
FIG. 12 is a side elevational view of the outer ball race for the freewheel illustrated in FIGS. 1–6, with the upper portion illustrated in cross-section.
Figure 13:
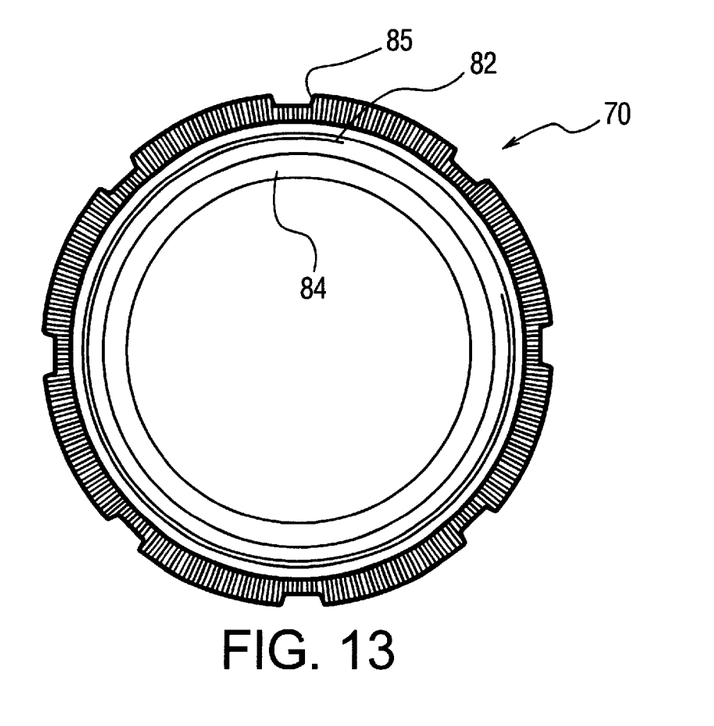
FIG. 13 is a right end elevational view of the outer ball race illustrated in FIG. 12 for the freewheel illustrated in FIGS. 1–6.

As seen in FIGS. 12 and 13, outer ball race or housing 70 includes an axially extending portion 80 and a radially outwardly extending flange portion 81 extending outwardly from one end of axial portion 80. Axial portion 80 has external threads 82 formed about its external surface for threadedly engaging the internal threads 54 of first outer section 51 of outer tubular body 17 to fixedly secure outer ball race or housing 70 to outer tubular body 17. The axial portion 80 also has a first outer bearing surface 83 and a second outer bearing surface 84 which is located on opposite sides of an inwardly extending flange.

First outer ball bearings surface 83 is a continuous annular surface with a curved surface for supporting first ball bearing 71. First outer bearing surface 83 faces inner bearing surface 46 and is arranged at a substantially 45° angle relative to the axis A of freewheel 15. Second outer bearing surface 84 is a continuous annular surface with a curved surface for supporting first ball bearing 72. Second outer bearing surface 84 also faces inwardly towards the longitudinal axis A of freewheel 15 at a 45° angle but in the opposite axial direction. First outer bearing surface 83 is adapted to receive first ball bearing 71 in a circular arrangement. Second outer bearing surface 84 is designed to receive second ball bearing 72 in a circular arrangement. Radial flange portion 81 of outer ball race or housing 70 has a plurality of notches 85 for receiving a tool to thread outer ball race or housing 70 into outer tubular body 17.

Figure 14:
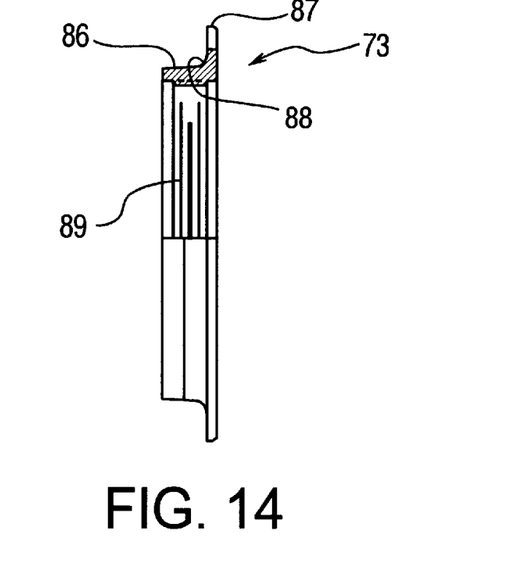
FIG. 14 is a side elevational view of the side plate for the flywheel illustrated in FIGS. 1–6, with the upper portion illustrated in cross-section.
Figure 15:
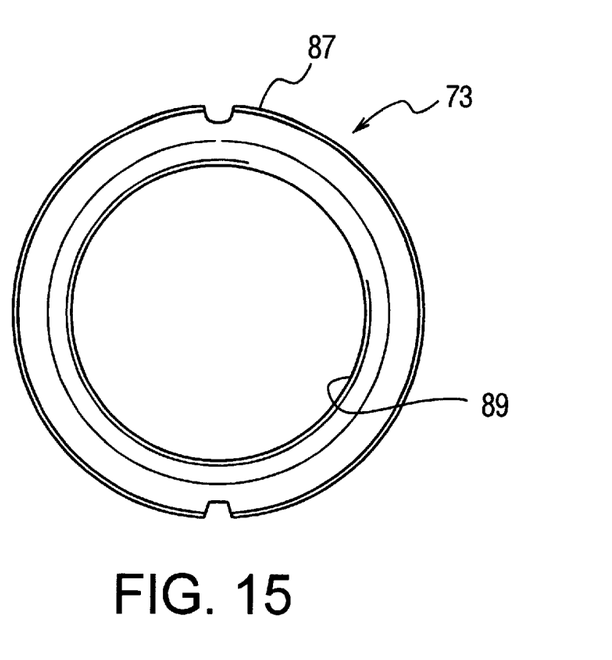
FIG. 15 is a right end elevational view of the side plate illustrated in FIG. 14 for the freewheel illustrated in FIGS. 1–6.

As seen in FIGS. 14 and 15, side plate 73 has an axial portion 86 and a radial flange portion 87 with a second inner bearing surface 88 formed therebetween on the external surface of side plate 73. Axial portion 86 has a set of internal threads 89 for threadedly engaging the external threads 47 of inner tubular body 16 to secure side plate 73 thereon.

As seen in FIGS. 5 and 6, shims 74 are located between the free end of axial portion 86 of side plate 73 and an abutment surface of inner tubular body 16. These shims 74 are utilized to adjust the relative location of inner bearing surfaces 46 and 88 relative to each other. In other words, fewer or more shims 74 can be inserted to change the relative axial distance between inner bearing surfaces 46 and 88. Alternatively, a single shim of different axial lengths can be substituted to change the relative axial distance between inner bearing surfaces 46 and 88.

Referring now back to FIGS. 4–6, one-way clutch 20 includes a pawl spring 91 and a pair of pawls 92 located 180° apart from each other on pawl spring 91. One-way clutch 20 also includes portions of inner and outer tubular bodies 16 and 17. In particular, one-way clutch 20 includes annular groove 49 and pawl seats 50 of inner tubular body 16 and ratchet teeth 59 of outer tubular body 17. Pawl spring 91 is located within groove 49 for securing pawls 92 in pawl seats 50. Pawl spring 91 holds the pawls 92 so as to normally engage ratchet teeth 59 such that outer tubular body 17 can rotate in one direction about longitudinal axis A but cannot rotate in the other direction.

Large spacers 28 are preferably constructed of hard rigid material such as a metallic material. Large spacers 28 are located between sprockets 21, 22 and 23 to hold the proper spacing.

The medium spacer 30 is located between sprockets 24 and 25, the L-shaped spacer 32 is located between sprockets 25 and 26 with its radially extending portion engaging sprocket 26 and its axially extending portion engaging sprocket 25.

Free wheel 15 is basically assembled by first attaching bearing assembly 18 and a portion of one-way clutch 20 to inner tubular body 16. Specifically, the first set of ball bearings 71 is placed on the bearing surface 46 of the inner tubular body 16, and then outer ball race or housing 70 is placed around inner tubular body 16 such that its outer bearing surface 83 engages the first set of ball bearings 71. Next, the appropriate number of shims 74 is placed about inner tubular body 16. With shims 74 in place, side plate 73 with the second set of ball bearings 72 arranged thereon is now installed on inner tubular body 16. In particular, internal threads 89 side plate 73 are threaded onto the external threads 47 of the inner tubular body 16. This completes the installation of bearing assembly 18 onto inner tubular body 16. In other words, outer ball race or housing 70 is now rotatably mounted on inner tubular body 16 with bearing assembly 18 located therebetween.

Next, the pawl spring 91 with pawls 92 can be installed on the second section 42 of inner tubular body 16 in a conventional manner. In particular, pawl spring 91 is inserted into annular groove 49 of second section 42 of inner tubular body 16 with pawls 92 being located in notches 50. Now, inner tubular body 16 can be installed inside of outer tubular body 17.

However, before installing inner tubular body 16 within outer tubular body 17, at least sprockets 21–23 and spacers 28 should be installed on the external surface of first section 51 of outer tubular body 17. Sprockets 24–27 23 and spacers 30 and 32, on the other hand can be installed either before or after inner tubular body 16 is installed inside of outer tubular body 17. In any event, in this embodiment, sprockets 21–23 and spacers 28 are installed from a first direction, while sprockets 24–27 and spacers 30 and 32 are installed from an opposite direction.

Sprockets 21–23 and spacers 28 are non-rotatably installed on the external surface of first section 51 of outer tubular body 17 by splines 55 in a conventional manner. Sprockets 21–23 are secured between the annular flange 85 of outer ball race or housing 70 and the plurality of abutment stoppers 56 that are formed on splines 55. The spacing between sprockets 21–23 is maintained by the two large spacers 28, which are located between sprockets 21–23.

Specifically, external threads 82 of outer ball race or housing 70 are threaded into the internal threads 54 of outer tubular body 17 to fixedly secure inner tubular body 16 within outer tubular body 17 and maintain sprockets 21–23 and spacers 28 on the external surface of first section 51 of outer tubular body 17. Accordingly, inner tubular body 16 is now rotatably supported within outer tubular body 17 by bearing assembly 18. If wear occurs in the bearing assembly 18, shim or shims 74 can be replaced with a smaller shim or the number of shims can be reduced to accommodate for the wear.

Now, the sprockets 24–27 and spacers 30 and 32 can be installed on the external surface of outer tubular body 17. Specifically, sprockets 24–27 are non-rotatably installed on the second and third sections 52 and 53 of outer tubular body 17 by splines 58 and 61. Sprocket 24 is abutted against wall 57 of outer tubular body 17 with spacer 30 being located between sprockets 24 and 25. The L-shaped spacer 32 is located between sprockets 25 and 26. Sprocket 27 has an integrally formed spacer for maintaining separation between sprockets 26 and 27. Finally, locking ring 34 is threaded onto threads 62 of outer tubular body 17 to secure sprockets 24–27 in place. Now, the freewheel 15 can be installed onto rear hub 5 of the bicycle 1 in a conventional manner.

SECOND EMBODIMENT

Figure 16:
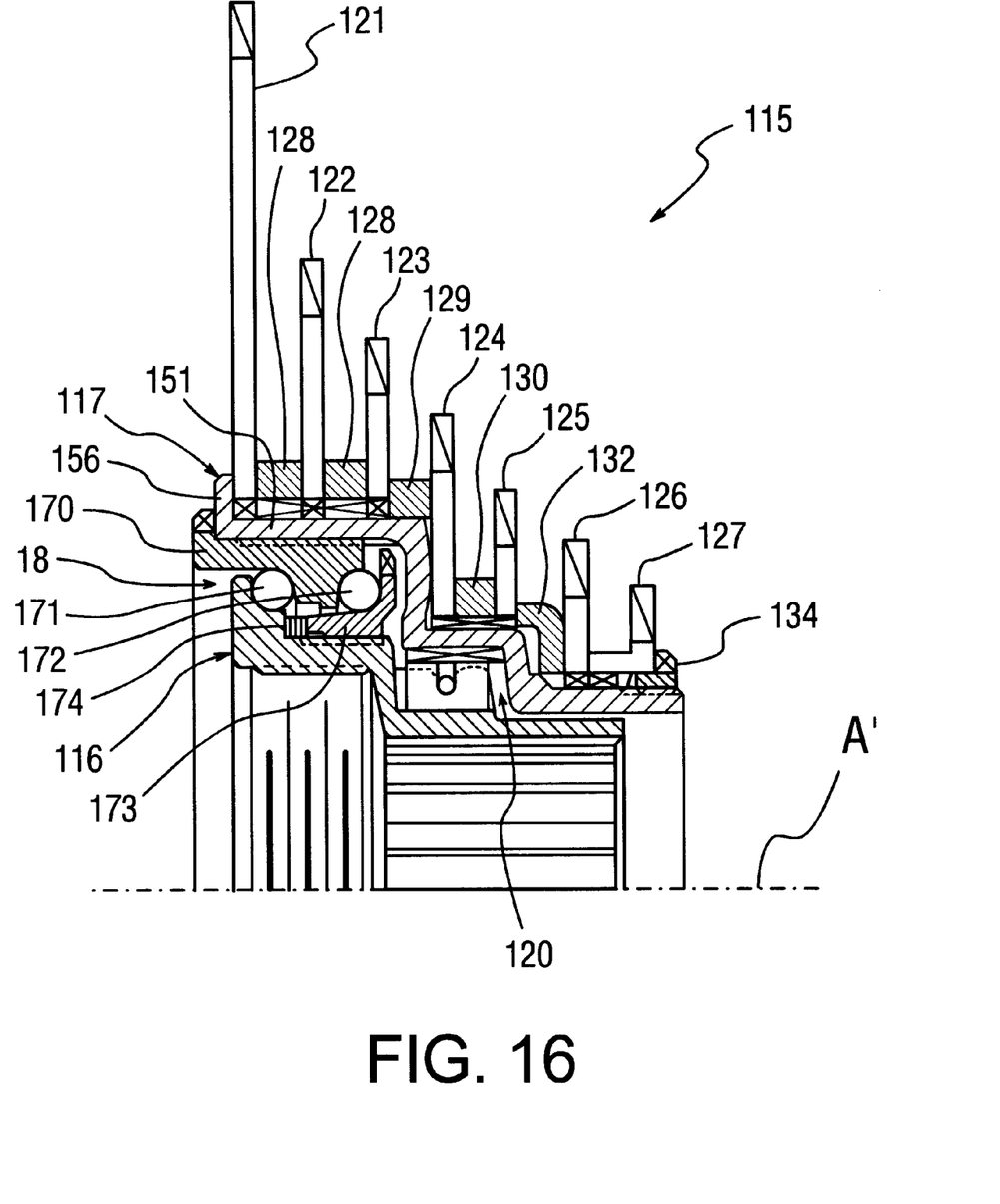
FIG. 16 is a partial cross-sectional view of an alternate freewheel in accordance with a second embodiment of the present invention.

Referring now to FIG. 16, a freewheel 115 in accordance with a second embodiment of the present invention will now be discussed. This embodiment is substantially identical to the first embodiment, except that the abutment stoppers 56 have been eliminated in this embodiment and replaced with an annular abutment flange 156 on the large diameter section 151 of outer tubular body 117. Accordingly, all of the sprockets 121–127 of freewheel 115 are installed from a single direction. In view of the similarities between this embodiment and the prior embodiment, this embodiment will not be discussed or illustrated in detail herein.

Basically, freewheel 115 includes an inner tubular body 116, an outer tubular body 117 coaxially mounted on inner tubular body 116, a bearing assembly 118 rotatably coupling inner tubular body 116 to outer tubular body 117 and a one-way clutch 120 coupled between inner tubular body 116 and outer tubular body 117 so as to allow one way rotation between inner and outer tubular bodies 116 and 117. Inner tubular body 116 is identical to inner tubular body 16 of the first embodiment, and thus, inner tubular body 16 will not be discussed or illustrated in detail herein. As mentioned above, outer tubular body 117 is substantially identical to the first embodiment, except that the abutment stoppers 56 have been eliminated in this embodiment and replaced with an annular abutment flange 156 on the large diameter section 151 of outer tubular body 117.

In this embodiment, outer tubular body 117 also has seven sprockets 121–127 non-rotatably mounted to the external surface of outer tubular body 117. The spacings between sprockets 121–127 are maintained by two large spacers 128, a slightly smaller spacer 129, one medium spacer 130 and one smaller L-shaped spacer 132. Sprockets 121–127 are retained on the outer surface of outer tubular body 117 via a locking ring 134.

Bearing assembly 118 preferably includes an outer ball race or housing 170, a first set of ball bearings 171, a second set of ball bearings 172, a side plate 173 and a shim or shims 174. Since bearing assembly 118 is all located at one end of the freewheel 115, the other end can have a relatively small diameter for accommodating small sprocket 127. Bearing assembly 118 is substantially identical to the bearing assembly 18 of the first embodiment, and thus, bearing assembly 118 will not be discussed or illustrated in detail herein.

While several preferred embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A freewheel for a bicycle comprising:
    an inner tubular body having a first section with a first bearing surface and a second section;
    an outer tubular body concentrically arranged about said inner tubular body for relative rotational movement therebetween, said outer tubular body having a first section with a predetermined diameter and a second section with a predetermined diameter that is smaller than said predetermined diameter of said first section of said outer tubular body;
    an outer bearing housing removably secured to said first section of said outer tubular body, said outer bearing housing having a second bearing surface;
    a set of first bearings located between said first and second bearing surfaces in a first circular pattern;

a side plate removably secured to said first section of said inner tubular body with said first bearings being located axially between said first bearing surface and said side plate; and a set of second bearings arranged in a second circular pattern and located between a third bearing surface formed on said outer bearing housing and a fourth bearing surface formed on said side plate.

2. A freewheel for a bicycle according to claim 1, wherein said first and second circular patterns of said first and second bearings have substantially identical diameters.

3. A freewheel for a bicycle according to claim 1, wherein said first and second bearings are formed of a plurality of ball bearings.

4. A freewheel for a bicycle according to claim 3, wherein said second and third bearing surfaces face in substantially diverging directions, and said first and fourth bearing surfaces face in substantially converging directions.

5. A freewheel for a bicycle comprising:

an inner tubular body having a first section and a second section;

an outer tubular body concentrically arranged about said inner tubular body for relative rotational movement therebetween, said outer tubular body having a first section with a set of first splines axially extending between a free end and an attached end and a second section with a set of second splines extending between a free end and an attached end, said first section of said outer tubular body having predetermined diameter with said first splines having a radial height, and said second section of said outer tubular body having a predetermined diameter that is smaller than said predetermined diameter of said first section of said outer tubular body, said first section of said outer tubular body having at least one abutment stopper located adjacent said attached end of said first section of said outer tubular body, said abutment stopper extending outwardly in a radial direction from said first section of said outer tubular body by a distance greater than said radial height of said first splines;

a set of first bearings located between said inner and outer tubular bodies in a first circular pattern, an outer bearing housing removably secured to said first section of said inner tubular body, said first section of said inner tubular body having a first bearing surface and said outer bearing housing having a second bearing surface with said first bearing located between said first and second bearing surfaces;

a side plate removably secured to said first section of said inner tubular body to retain said outer bearing housing and said first bearings on said inner tubular body between said first bearing surface and said side plate; and a set of second bearings arranged in a second circular pattern and located between a third bearing surface formed on said outer bearing housing and a fourth bearing surface formed on said side plate.

6. A freewheel for a bicycle according to claim 5, wherein said first and second circular patterns of said first and second bearings have substantially identical diameters.

7. A freewheel for a bicycle according to claim 5, wherein said first and second bearings are formed of a plurality of ball bearings.

8. A freewheel for a bicycle according to claim 7, wherein said second and third bearing surfaces face in substantially diverging directions, and said first and fourth bearing surfaces face in substantially converging directions.

\* \* \* \* \*